United States Patent
Brown et al.

(10) Patent No.: US 10,283,804 B2
(45) Date of Patent: May 7, 2019

(54) FLANGE ASSEMBLY FOR USE WITH A SOLID OXIDE FUEL CELL SYSTEM

(71) Applicant: General Electric Company, Schenectady, NY (US)

(72) Inventors: Keith Garrette Brown, Clifton Park, NY (US); Liwei Hao, Niskayuna, NY (US); Darren Bawden Hickey, Halfmoon, NY (US); Kevin Joseph Gavel, Galway, NY (US); John Raymond Krahn, Mesa, AZ (US); Qin Chen, Schenectady, NY (US); Lili Zhang, Niskayuna, NY (US); Daniel Qi Tan, Rexford, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 292 days.

(21) Appl. No.: 15/331,421

(22) Filed: Oct. 21, 2016

(65) Prior Publication Data

US 2018/0115011 A1    Apr. 26, 2018

(51) Int. Cl.
| | |
|---|---|
| H01M 8/2485 | (2016.01) |
| H01M 8/2484 | (2016.01) |
| H01M 8/2465 | (2016.01) |
| F16L 25/02 | (2006.01) |
| F16L 55/24 | (2006.01) |

(Continued)

(52) U.S. Cl.
CPC ....... *H01M 8/2485* (2013.01); *F16L 25/0072* (2013.01); *F16L 25/026* (2013.01); *F16L 55/24* (2013.01); *H01M 8/0662* (2013.01); *H01M 2008/1293* (2013.01); *H01M 2250/10* (2013.01); *Y02B 90/14* (2013.01); *Y02E 60/525* (2013.01)

(58) Field of Classification Search
None
See application file for complete search history.

(56) References Cited

U.S. PATENT DOCUMENTS

| | | |
|---|---|---|
| 1,592,175 A | 7/1926 | Boyd |
| 4,467,018 A | 8/1984 | Schroll |

(Continued)

FOREIGN PATENT DOCUMENTS

| | | |
|---|---|---|
| CN | 2856674 Y | 1/2007 |
| EP | 0 930 452 A1 | 7/1999 |

(Continued)

OTHER PUBLICATIONS

Extended European Search Report and Opinion issued in connection with corresponding EP Application No. 17194596.7 dated Mar. 13, 2018.

(Continued)

*Primary Examiner* — Yoshitoshi Takeuchi
(74) *Attorney, Agent, or Firm* — GE Global Patent Operation; John Darling (57) ABSTRACT

A flange assembly for use with a SOFC system includes a first flange, a second flange, and a dielectric element coupled between the first flange and the second flange. The dielectric element includes an outer cylindrical surface and an inner cylindrical surface. The inner cylindrical surface defines a cylindrical region having a circumference. The inner cylindrical surface also defines a channel that extends radially about the circumference of the cylindrical region.

13 Claims, 7 Drawing Sheets

(51) Int. Cl.
*H01M 8/0662* (2016.01)
*F16L 25/00* (2006.01)
*H01M 8/124* (2016.01)

(56) References Cited

U.S. PATENT DOCUMENTS

| | | |
|---|---|---|
| 7,276,304 B2 | 10/2007 | Kelley et al. |
| 7,524,573 B2 | 4/2009 | Tomimatsu et al. |
| 8,383,283 B2 | 2/2013 | Yuh et al. |
| 8,623,569 B2 | 1/2014 | Gottmann et al. |
| 8,921,001 B2 | 12/2014 | Huynh et al. |
| 8,962,205 B2 | 2/2015 | Terada et al. |
| 8,962,210 B2 | 2/2015 | Ma et al. |
| 8,968,509 B2 | 3/2015 | Gottmann et al. |
| 9,005,837 B2 | 4/2015 | Jian et al. |
| 9,090,514 B2 | 7/2015 | Farrenkopf et al. |
| 9,252,434 B2 | 2/2016 | Kumar et al. |
| 9,318,758 B2 | 4/2016 | Shinohara et al. |
| 2004/0038109 A1 | 2/2004 | Bernacki |
| 2005/0058872 A1 | 3/2005 | Blanchet et al. |
| 2006/0188769 A1 | 8/2006 | Bernard et al. |
| 2010/0015491 A1 | 1/2010 | Yamanis |
| 2014/0147766 A1* | 5/2014 | Huynh ............... H01M 8/2425 429/458 |
| 2015/0194695 A1* | 7/2015 | Gottmann ......... H01M 8/04022 429/455 |

FOREIGN PATENT DOCUMENTS

| | | | |
|---|---|---|---|
| EP | 0930452 | * 7/1999 | ............... F16J 15/08 |
| EP | 1525636 B1 | 4/2013 | |
| EP | 1665412 B1 | 6/2013 | |
| JP | 2001-317670 A | 11/2001 | |

OTHER PUBLICATIONS

Raj N Singh, "Sealing Technology for Solid Oxide Fuel Cells (SOFC)", International Journal of Applied Ceramic Technology, vol. 4, Issue: 2, pp. 134-144, Mar. 2007.

Olenick et al., "In Situ Seal Integrity Sensing for Solid Oxide Fuel Cells", Fuel Cell Electronics Packaging, pp. 85-96, 2007.

* cited by examiner

FIG. 8

FLANGE ASSEMBLY FOR USE WITH A SOLID OXIDE FUEL CELL SYSTEM

BACKGROUND

The subject matter disclosed herein relates to fuel cell systems and, more particularly, to a flange assembly for use with a solid oxide fuel cell (SOFC) system.

Fuel cells are electrochemical energy conversion devices that have demonstrated a potential for relatively high efficiency and low pollution in power generation. Certain fuel cells, such as SOFCs, operate in large-scale power systems that provide electricity to satisfy industrial and municipal needs.

Many known SOFC systems include a plurality of electrically interconnected SOFCs. More particularly, many known SOFC systems include a plurality of electrically interconnected SOFC "stacks," which, in turn, include a plurality of electrically interconnected SOFCs. During operation, a supply of fuel and air is delivered to each SOFC stack by way of one or more fuel and/or air pipes originating from an associated balance of plant (BOP) subsystem.

Typically, BOP subsystems in known SOFC systems are electrically grounded, while the plurality of SOFC stacks operate at voltage (e.g., approximately 1000 volts). The plurality of known SOFC stacks further operate at a temperature in the range of approximately 600-800 degrees Celsius, while BOP subsystems operate at temperatures that are significantly lower.

To electrically insulate SOFC systems from associated BOP subsystems, some known SOFC systems separate SOFC stacks from associated BOP subsystems using a dielectric material or insulator placed between each SOFC stack and its BOP mounting plate. Other known systems separate SOFC stacks using a dielectric material integrated with BOP pipes coupled to the SOFC stack.

Conventional insulation mechanisms may, however, break down, fracture, or otherwise degrade after prolonged exposure to the electrical variations that occur between SOFC stacks and the BOP.

BRIEF DESCRIPTION

In one aspect, a flange assembly for use with a SOFC system is provided. The flange assembly includes a first flange, a second flange, and a dielectric element coupled between the first flange and the second flange. The dielectric element includes an outer cylindrical surface and an inner cylindrical surface. The inner cylindrical surface defines a cylindrical region having a circumference. The inner cylindrical surface also defines a channel that extends radially about the circumference of the cylindrical region.

In another aspect, a SOFC system is provided. The SOFC system includes a SOFC stack, a first fluid conduit extending from said SOFC stack, a BOP subsystem, a second fluid conduit extending from said BOP subsystem, and a flange assembly coupled between the first fluid conduit and the second fluid conduit. The flange assembly includes a first flange, a second flange, and a dielectric element coupled between the first flange and the second flange. The dielectric element includes an outer cylindrical surface and an inner cylindrical surface. The inner cylindrical surface defines a cylindrical region having a circumference. The inner cylindrical surface also defines a channel that extends radially about the circumference of the cylindrical region.

In yet another aspect, a SOFC system is provided. The SOFC system includes a plurality of SOFC stacks, a BOP subsystem, and a plurality of flange assemblies. Each flange assembly is coupled between one of the plurality of SOFC stacks and the BOP subsystem. Each flange assembly includes a first flange, a second flange, and a dielectric element coupled between the first flange and the second flange. The dielectric element includes an outer cylindrical surface and an inner cylindrical surface. The inner cylindrical surface defines a cylindrical region having a circumference. The inner cylindrical surface also defines a channel that extends radially about the circumference of the cylindrical region.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the present disclosure relate to a flange assembly for use with a SOFC system. In the exemplary embodiment, the flange assembly is coupled between a BOP subsystem and a plurality of SOFC stacks. The flange assembly electrically insulates the plurality of SOFC stacks from the BOP subsystem. More particularly, the flange assembly includes a dielectric element that is coupled between two flanges. The dielectric element, which is cylindrical, has an interior trough or channel that interrupts or perturbs gas flow within the dielectric element during operation of the SOFC system to prevent the formation of a uniform or continuous layer of electrically conductive coke (or carbon) within the dielectric element. The dielectric element is thus designed to provide an electrical barrier that does not degrade, due to coking, over the course of time.

Figure 1:
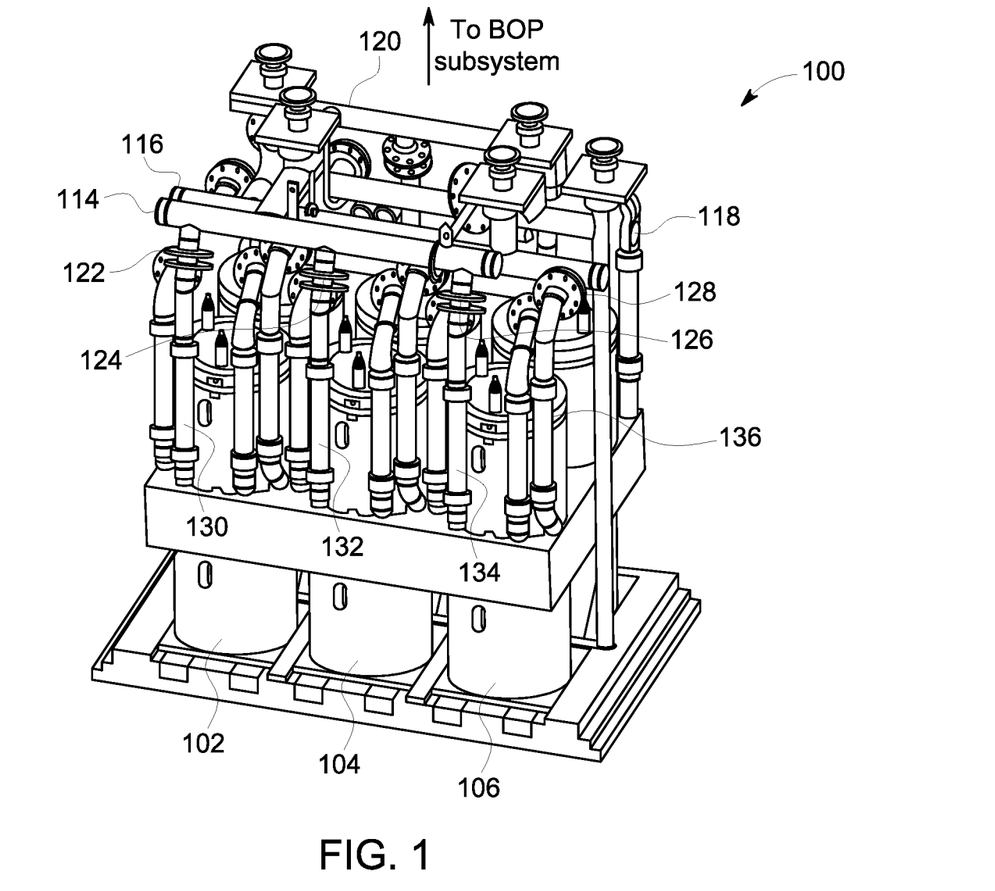
FIG. 1 is a perspective view of an exemplary SOFC system.

FIG. 1 is a perspective view of an exemplary SOFC system 100. SOFC system 100 includes a plurality of SOFC stacks, such as SOFC stacks 102, 104, and 106. Each SOFC stack 102-106 includes a plurality of interconnected SOFCs. SOFCs in a SOFC stack are, for example, electrically and mechanically interconnected.

In the exemplary embodiment, SOFC system 100 further includes a BOP subsystem 101. As described in greater detail below, BOP subsystem 101 supplies fuel and air to each of SOFC stacks 102-106. To this end, a first plurality of fluid conduits 114, 116, 118, and 120 are coupled at one end to BOP subsystem 101 and at another end to one of a plurality of flange assemblies 122, 124, 126, or 128. A second plurality of fluid conduits 130, 132, 134, and 136 are, likewise, coupled at one end to one of SOFC stacks 102-106 and at another end to one of flange assemblies 122-128. Thus, each flange assembly 122-128 is coupled between one of SOFC stacks 102-106 and BOP subsystem 101, or more particularly, between fluid conduits 114-120 and fluid conduits 130-136.

Each flange assembly 122-128 therefore separates BOP subsystem 101 from SOFC stacks 102-106. Accordingly, as described in greater detail below, flange assemblies 122-128 facilitate electrical separation or insulation between BOP subsystem 101 and SOFC stacks 102-106.

Figure 2:
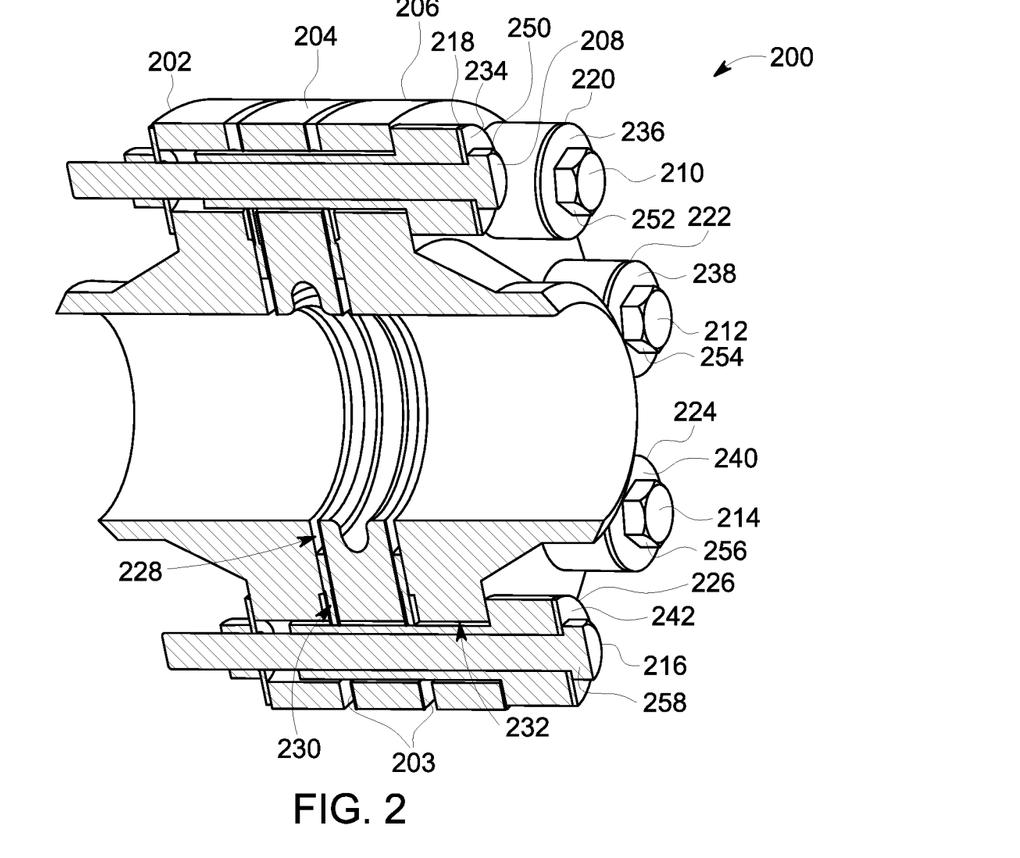
FIG. 2 is a cross-sectional view of an exemplary flange assembly that may be used with the SOFC system shown in FIG. 1.

FIG. 2 is a cross-sectional view of an exemplary flange assembly 200 that is used with SOFC system 100 (shown in FIG. 1). In the exemplary embodiment, flange assembly 200 includes a first flange 202, a dielectric element 204, and a second flange 206. Briefly, and with returning reference to FIG. 1, each of fluid conduits 114-120 is coupled at one end to a first flange, such as first flange 202, and each of fluid conduits 130-136 is coupled at one end to a second flange, such as second flange 206.

First flange 202 and second flange 206 correspond to standard flanges in accordance with American Society of Mechanical Engineers (ASME) flange standards but could be any flange similar to an ASME flange. Dielectric element 204 is fabricated or manufactured from, without limitation, any suitable dielectric material, such as any suitable ceramic material, including, for example, any composition of aluminum oxide (or "alumina").

Dielectric element 204 is coupled between first flange 202 and second flange 206. In particular, dielectric element 204 is coupled between first flange 202 and second flange 206 by a plurality of fasteners or bolts, such as bolts 208, 210, 212, 214, and 216. Bolts 208-216 extend through a plurality of bolt holes, which are drilled, cast, 3D-printed, stamped, or made by any other suitable forming process in each of first flange 202, dielectric element 204, and second flange 206. Bolts 208-216 include head portions 250, 252, 254, 256, 258, and 260.

Dielectric element 204 thus facilitates electrical insulation between first flange 202 and second flange 206. More particularly, dielectric element 204 electrically isolates or separates fluid conduits 114-120 extending from BOP subsystem 101 from fluid conduits 130-136 extending from each SOFC stack 102-106. Introduction of dielectric element 204 between flanges 202 and 206 further facilitates the use of standard ASME flanges in the construction of flange assembly 200, which reduces cost and complexity and facilitates electrical separation of system components by flange assembly 200.

Further, in the exemplary embodiment, a conductive surface coating 203 is applied to dielectric element 204. In the exemplary embodiment, conductive surface coating 203 is one or more of, and without limitation, painted, sprayed, baked, sputtered, filmed, foiled, meshed, and pasted onto all or a part of the surface of dielectric element 204.

In the exemplary embodiment, each of bolts 208, 210, 212, 214, and 216 extends through a shoulder washer, such as a shoulder washer 218, 220, 222, 224, and 226. Each shoulder washer 218-226 partially or completely extends about each bolt 208-216. In an alternative embodiment, each shoulder washer 218-226 partially or completely covers or surrounds each bolt 208-216. In addition, each shoulder washer 218-226 is fabricated or manufactured from, without limitation, a dielectric material. For example, each shoulder washer 218-226 is fabricated or manufactured from, without limitation, any suitable dielectric material, such as any suitable ceramic material, including, for example, any composition of aluminum oxide.

In the exemplary embodiment, a washer is inserted between a bolt and a shoulder washer. For example, a washer 234 is inserted between bolt 208 and shoulder washer 218. Likewise, a washer 236 is inserted between bolt 210 and shoulder washer 220, a washer 238 is inserted between bolt 212 and shoulder washer 222, a washer 240 is inserted between bolt 214 and shoulder washer 224, and a washer 242 is inserted between bolt 216 and shoulder washer 226. Washers 234-242 comprise any suitable type of washer, such as, for example, and without limitation, metal or ceramic washers. In an embodiment, an elastic insulation sheet, such as a sheet of mica, is inserted between any of a washer 234-242 and respective shoulder washer 218-226. The application of such an insulation sheet minimizes uneven stress applied to ceramic shoulder washers 218-226, which may otherwise cause ceramic chip-off.

Further, in the exemplary embodiment, each shoulder washer 218, 220, 222, 224, and 226 includes a conductive surface coating 219, 221, 223, 225, and 227, respectively, which is one or more of, and without limitation, painted, sprayed, baked, sputtered, filmed, foiled, meshed, and pasted onto a surface (e.g., an outer or exterior surface) of each shoulder washer 218-226. For instance, in an embodiment, conductive coating 219-227 is applied to part of various surfaces of shoulder washers 218-226 (as described below with reference to FIG. 6).

Figure 3:
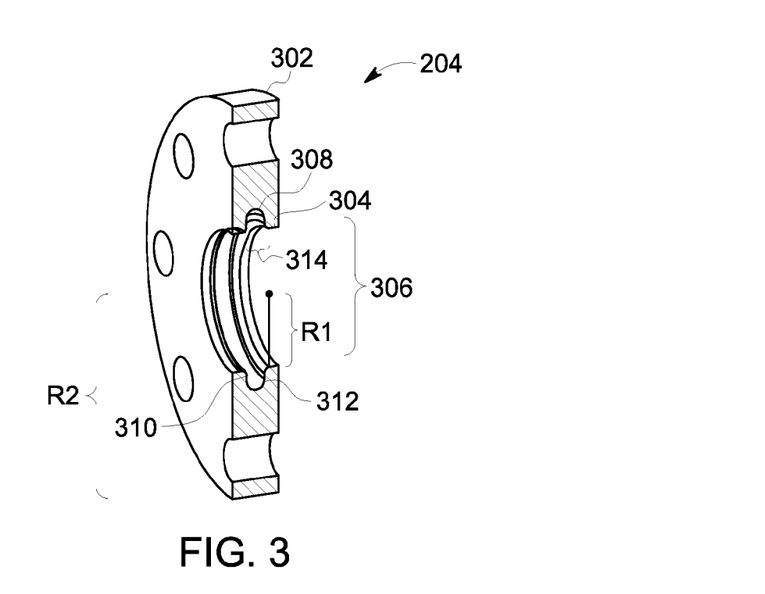
FIG. 3 is a cross-sectional view of an exemplary dielectric element of the flange assembly shown in FIG. 2.

FIG. 3 is a cross-sectional view of an exemplary dielectric element 204 of flange assembly 200 (shown in FIG. 2). In the exemplary embodiment, dielectric element 204 includes an outer cylindrical surface 302 and an inner cylindrical surface 304. Inner cylindrical surface 304 defines a cylindrical region 306 through which an air or fuel gas is transferred. Outer cylindrical surface 302 has a radius R2. Likewise, cylindrical region 306 has a radius R1 and a circumference C, which is defined by the formula C=2πR1.

In the exemplary embodiment, inner cylindrical surface 304 further defines a channel 308. Channel 308 extends radially about circumference, C, of inner cylindrical surface 304. More particularly, inner cylindrical surface 304 includes a first radial wall 310 and a second radial wall 312. The first radial wall 310 is axially separated from the second radial wall 312 by a distance D.

Figure 7:
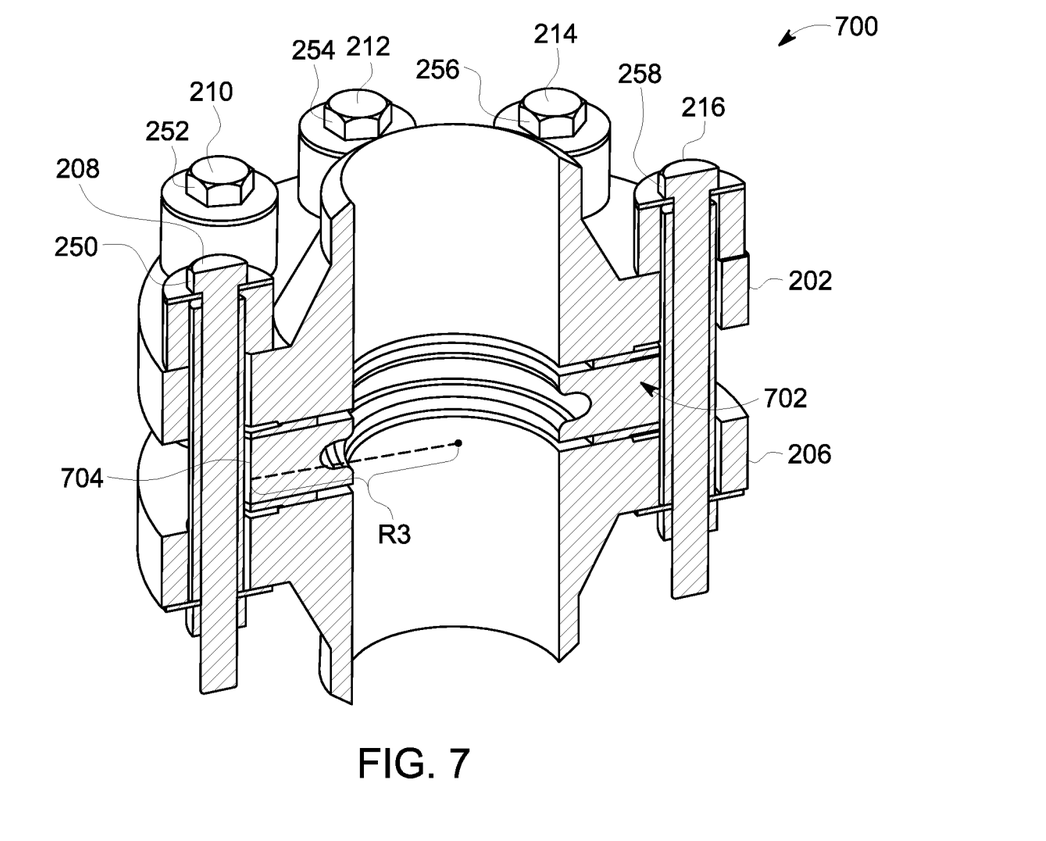
FIG. 7 is a cross-sectional view of an alternative flange assembly that is used with the SOFC system shown in FIG. 1.

FIG. 7 is a cross-sectional view of an alternative flange assembly 700 that is used with SOFC system 100 (shown in FIG. 1). In some embodiments, flange assembly 700 is identical to flange assembly 200, except that flange assembly 700 includes a truncated dielectric element 702. Specifically, truncated dielectric element 702 includes an outer cylindrical surface 704 that has a radius R3. Radius R3 is less than radius R2 of outer cylindrical surface 302 of dielectric element 204. In addition, unlike dielectric element 204, truncated dielectric element 702 does not include bolt holes, because a plurality of bolts, such as bolts 208-216, extend between first flange 202 and second flange 206 without making contact with truncated dielectric element 702.

Figure 4:
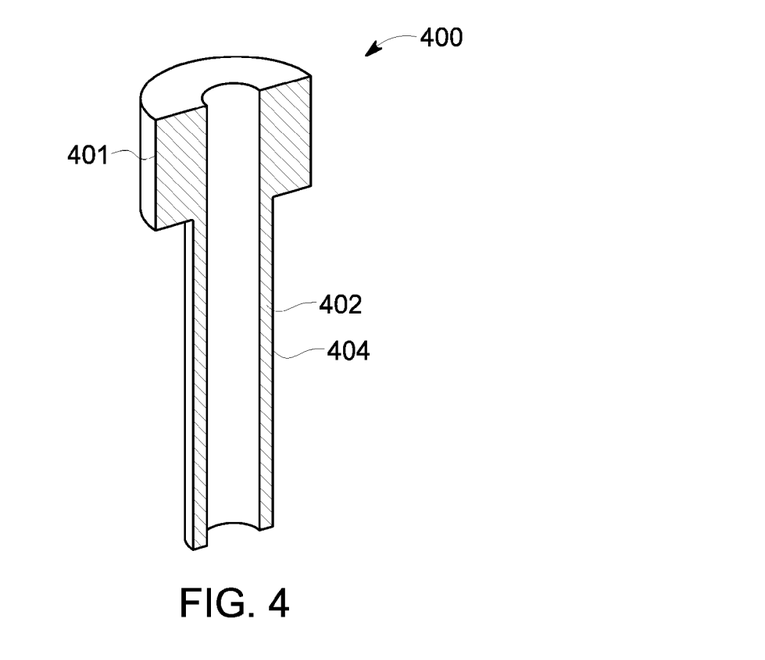
FIG. 4 is a cross-sectional view of an exemplary shoulder washer of the flange assembly shown in FIG. 2.

FIG. 4 is a cross-sectional view of an exemplary shoulder washer 400 of flange assembly 200 (shown in FIG. 2). Shoulder washer 400 includes a cylindrical sleeve 402, which receives or accepts one of a plurality of bolts 208-216. Shoulder washer 400 further includes a shoulder portion 401 that is integrally formed with the sleeve 402 and which also receives or accepts one of bolts 208-216. Shoulder washer 400 further includes an exterior or outer surface 404, which is coated, as described above, with a conductive substance. The conductive substance is one or more of, and without limitation, painted, sprayed, baked, sputtered, filmed, foiled, meshed, and pasted onto the outer surface 404.

Figure 8:
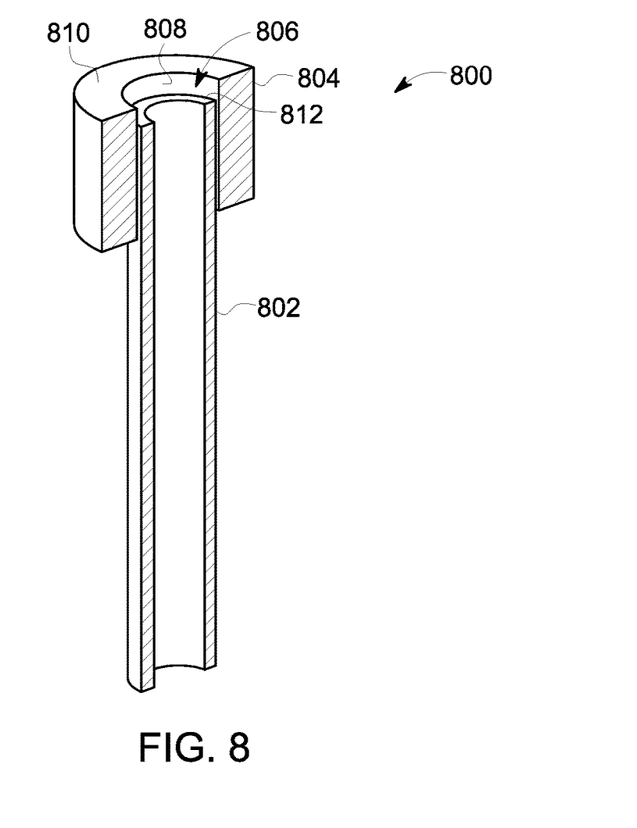
FIG. 8 is a cross-sectional view of an alternative shoulder washer that is used with the flange assembly shown in FIG. 2 as well as the flange assembly shown in FIG. 7.

FIG. 8 is a cross-sectional view of an alternative shoulder washer 800. Shoulder washer 800 is used with flange assembly 200 as well as flange assembly 700. Shoulder washer 800 thus includes a cylindrical sleeve 802, which receives or accepts one of bolts 208-216. Shoulder washer 800 further includes a shoulder portion 804. Cylindrical sleeve 802 extends through an interior cylindrical passage 806 defined by a cylindrical surface 808 within shoulder portion 804. However, cylindrical sleeve 802 does not extend to an outer collar 810 of shoulder portion 804. Rather, cylindrical sleeve 802 is seated within shoulder portion 804, such that an end 812 of cylindrical sleeve 802 rests below the level of outer collar 810. Shoulder portion 804 thus bears the whole load of one of bolts 208-216 when one of bolts 208-216 is inserted through shoulder washer 800 and isolates a head portion, such as one of head portions 250-258, of each bolt 208-216 from flange assembly 200 or 700. Such a construction provides a more robust shoulder washer 800 and allows for improved assembly tolerances.

Further, in an alternate embodiment, shoulder portion 804 and cylindrical sleeve 802 are separate pieces that are coupled together. However, in the exemplary embodiment, shoulder portion and cylindrical sleeve 802 are integrally formed. Shoulder washer 800 is coated, fully or partially, like shoulder washer 400, with a conductive substance.

Figure 6:
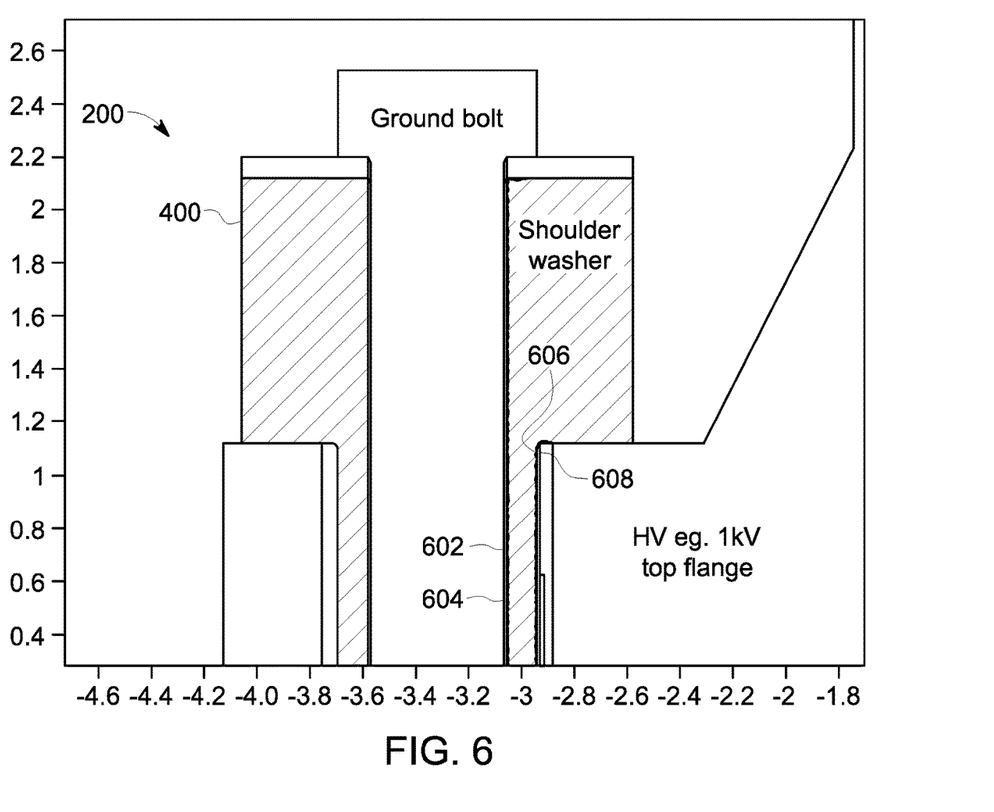
FIG. 6 is a cross-sectional view of the flange assembly shown in FIG. 2, in which a plurality of conductive surface coatings are applied.

FIG. 6 is a cross-sectional view of flange assembly 200. As shown, in the exemplary embodiment, a first conductive surface coating 602 is applied to shoulder washer 400 at a first surface location 604. Similarly, a second conductive surface coating 606 is applied to shoulder washer 400 at a second surface location 608. First conductive surface coating 602 equalizes the electrical potential between one of bolts 208-216 and first surface location 604. Second conductive surface coating 606 equalizes the electrical potential between flange assembly 200 and second surface location 608.

Conductive surface coating 203 applied to dielectric element 204 acts to prevent or reduce electrical arcing or corona discharge, which may, absent conductive surface coating 203, occur between dielectric element 204 and one or both of first and second flanges 202 and 206 and/or between dielectric element 204 and other portions of flange assembly 200.

For example, and with returning reference to FIG. 2, several locations 228, 230, and 232 within flange assembly 200 in which electrical arcing and/or corona discharge may occur are shown. Such locations may include small gaps between flange assembly 200 components, which may encourage the concentration of electrical charge. The various conductive surface coatings described herein function to more evenly distribute floating electrical charges over the surfaces of various flange assembly components, such as dielectric element 204 and shoulder washers 218-226, thereby reducing the concentration of electrical potential at corners and edges within flange assembly 200 (and consequently, the development of electrical arc and corona discharge potential in those locations).

Figure 5:
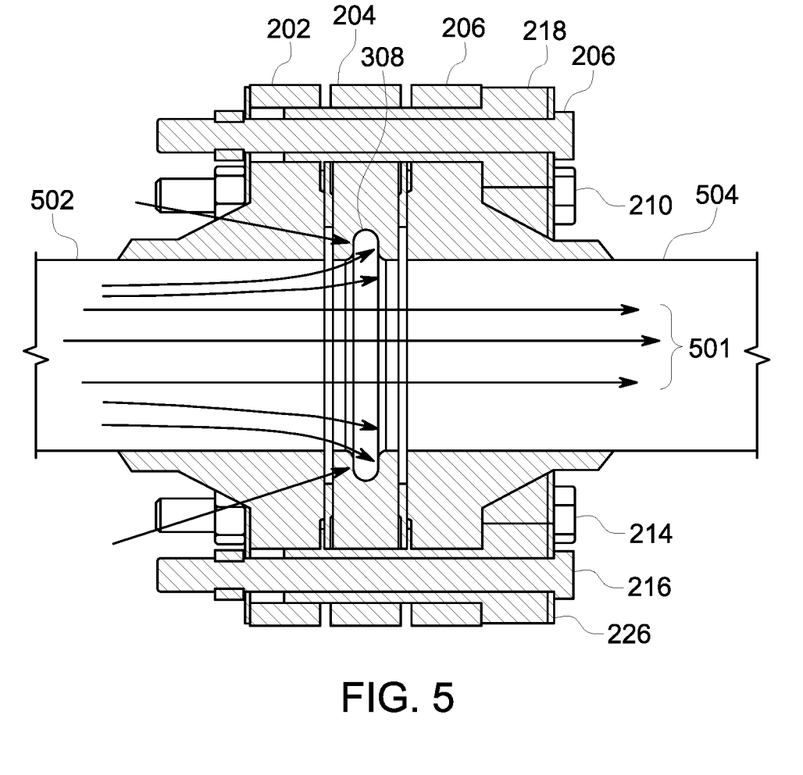
FIG. 5 is a cross-sectional view of the flange assembly shown in FIG. 2 in which a gas flow path is illustrated.

FIG. 5 is a cross-sectional view of flange assembly 200 in which a gas flow path is illustrated. Accordingly, during operation, a gas 501 (e.g., a gaseous air or fuel or air/fuel mixture) flows into flange assembly 200 from a first fluid conduit 502 (which is, e.g., coupled, at a distal end thereof, to BOP subsystem 101).

As gas 501 travels through flange assembly 200, conductive or non-conductive particles or contaminants, such as coke, rust, sulfur, nickel, and metal shavings trapped or flowing within gas 501 impinge upon and collect within channel 308. More particularly, particles impinge upon second radial wall 312 of dielectric element 204, such that particles accumulate, if at all, on second radial wall 312, leaving first radial wall 310 free, or substantially free, of particle accumulation. Channel 308 thus inhibits the development of coke, and other particle, formation uniformly or evenly over cylindrical inner surface 304 of dielectric element 204. Rather, although coke may, for example, develop and accumulate within dielectric element 204, channel 308 induces a gap, break, or interruption in the formation of an otherwise continuous (or substantially continuous) coke layer between first flange 202 and second flange 206. In the exemplary embodiment, gas 501 continues past channel 308 to exit flange assembly 200 at second fluid conduit 504, which delivers gas 501 flowing therein to one of SOFC stacks 102-106.

Dielectric element 204 thus electrically isolates, or separates, first flange 202 from second flange 206. Channel 308 further acts to maintain the electrical separation between flanges 202 and 206, because channel 308 disrupts coke and other particle deposition such that a continuous (and conductive) layer of deposits is prevented by channel 308 from forming between first flange 202 and second flange 206. For example, as a result of the break in coke accumulation accomplished by channel 308, electrical currents are prevented (or discouraged) from creeping or arcing between first flange 202 and second flange 206.

Embodiments of the SOFC system, as described above, facilitate fuel and air transfer between a BOP subsystem and a plurality of SOFC stacks. A plurality of flange assemblies disposed between the BOP subsystem and each SOFC stack act to electrically insulate the plurality of SOFC stacks from the BOP subsystem. Moreover, a channel within an interior portion of each flange assembly disrupts gas flow within each flange assembly to interrupt coke formation and to preserve electrical isolation between the BOP subsystem and each SOFC stack.

Exemplary technical effects of the flange assembly described herein include, for example: (a) electrically insulating a BOP subsystem from a SOFC stack or from a plurality of SOFC stacks; (b) reducing or eliminating arcing and/or corona discharge between flange assembly components; and (c) disrupting coke and other particle accumulation within the flange assembly to maintain electrical separation between flange components.

Exemplary embodiments of a SOFC system and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with the systems and related methods as described herein. Rather, the exemplary embodiment can be implemented and utilized in connection with many applications where compressing a fluid is desired.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A flange assembly for use with a solid oxide fuel cell (SOFC) system, said flange assembly comprising:
    a first flange;
    a second flange; and
    a dielectric element coupled between said first flange and said second flange,
    said dielectric element comprising an outer cylindrical surface and an inner cylindrical surface, said inner cylindrical surface defining a cylindrical region having a circumference, said inner cylindrical surface further defining a channel that extends radially about the circumference of the cylindrical region; and
    at least one bolt and at least one dielectric shoulder washer, said at least one bolt coupling said first flange to said second flange, said at least one dielectric shoulder washer at least partially extending about said at least one bolt, wherein said dielectric shoulder washer comprises an electrically conductive surface coating.

2. The flange assembly of claim 1, wherein said dielectric element comprises an electrically conductive surface coating.

3. The flange assembly of claim 1, wherein said outer cylindrical surface comprises an electrically conductive surface coating.

4. The flange assembly of claim 1, wherein the channel is configured to induce a flow perturbation within said cylindrical region.

5. The flange assembly of claim 1, wherein the channel is defined by a first radial wall and a second radial wall, said first radial wall axially separated from said second radial wall.

6. A solid oxide fuel cell (SOFC) system, the SOFC system comprising:
    a SOFC stack comprising a plurality of interconnected SOFCs;
    a first fluid conduit extending from said SOFC stack;
    a balance of plant (BOP) subsystem;
    a second fluid conduit extending from said BOP subsystem; and
    a flange assembly coupled between said first fluid conduit and said second fluid conduit, said flange assembly comprising:
        a first flange;
        a second flange; and
        a dielectric element coupled between said first flange and said second flange,
        said dielectric element comprising an outer cylindrical surface and an inner cylindrical surface, said inner cylindrical surface defining a cylindrical region having a circumference, said inner cylindrical surface further defining a channel that extends radially about the circumference of the cylindrical region; and
        at least one bolt and at least one dielectric shoulder washer, said at least one bolt coupling said first flange to said second flange, said at least one dielectric shoulder washer at least partially extending about said at least one bolt, wherein said dielectric shoulder washer comprises an electrically conductive surface coating.

7. The SOFC system of claim 6, wherein said dielectric element comprises an electrically conductive surface coating.

8. The SOFC system of claim 6, wherein said outer cylindrical surface comprises an electrically conductive surface coating.

9. The SOFC system of claim 6, wherein the channel is defined by a first radial wall and a second radial wall, said first radial wall axially separated from said second radial wall.

10. A solid oxide fuel cell (SOFC) system, said SOFC system comprising:
    a plurality of SOFC stacks,
        each SOFC stack of said plurality of SOFC stacks comprising a plurality of interconnected SOFCs;
    a balance of plant (BOP) subsystem; and
    a plurality of flange assemblies,
        each flange assembly of said plurality of flange assemblies coupled between one of said plurality of SOFC stacks and said BOP subsystem,
        each flange assembly of said plurality of flange assemblies comprising:
            a first flange;
            a second flange; and
            a dielectric element coupled between said first flange and said second flange,
            said dielectric element comprising an outer cylindrical surface and an inner cylindrical surface, said inner cylindrical surface defining a cylindrical region having a circumference, said inner cylindrical surface further defining a channel that extends radially about the circumference of the cylindrical region; and at least one bolt and at least one dielectric shoulder washer, said at least one bolt coupling said first flange to said second flange, said at least one dielectric shoulder washer at least partially extending about said at least one bolt, wherein said dielectric shoulder washer comprises an electrically conductive surface coating.

11. The SOFC system of claim 10, wherein the channel is configured to induce a flow perturbation within said cylindrical region.

12. The SOFC system of claim 10, wherein said outer cylindrical surface comprises an electrically conductive surface coating.

13. The SOFC system of claim 10, wherein the channel is defined by a first radial wall and a second radial wall, said first radial wall axially separated from said second radial wall.

* * * * *